Aug. 9, 1938.  H. R. BARNARD  2,126,441
GRASS MOWING APPLIANCE
Filed Oct. 29, 1935   2 Sheets-Sheet 1
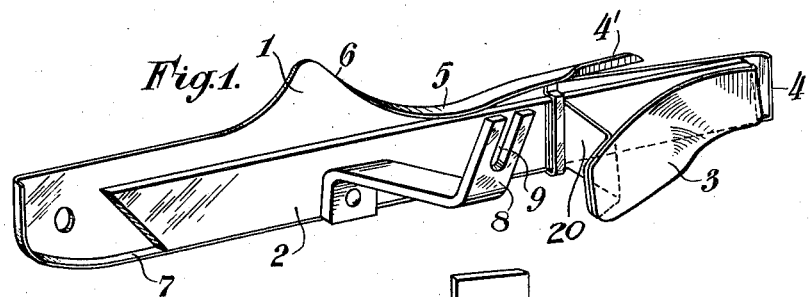
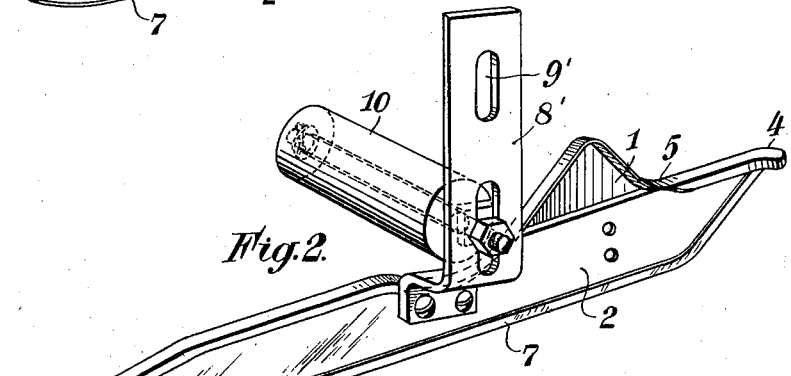
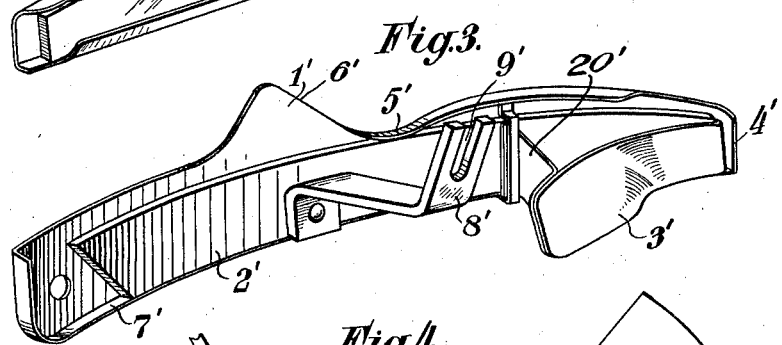
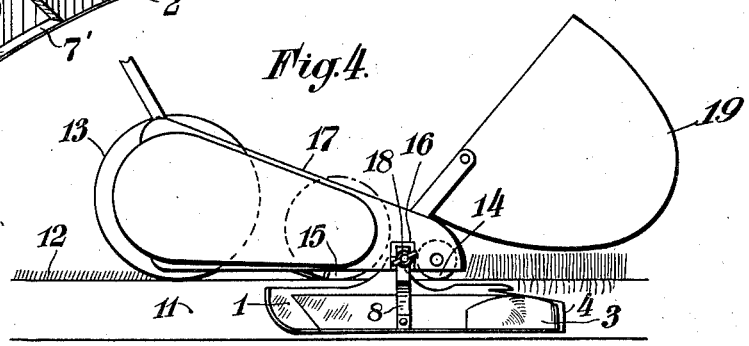
Henry Richard Barnard
INVENTOR.
By John E. Eastlack
atty

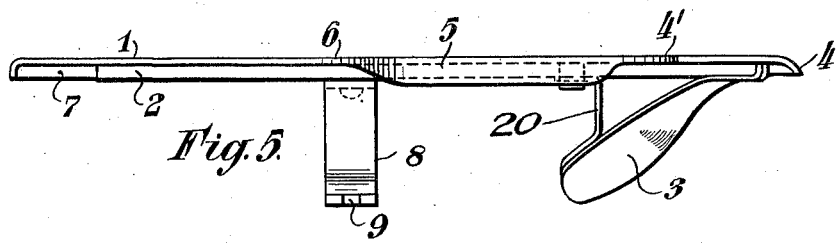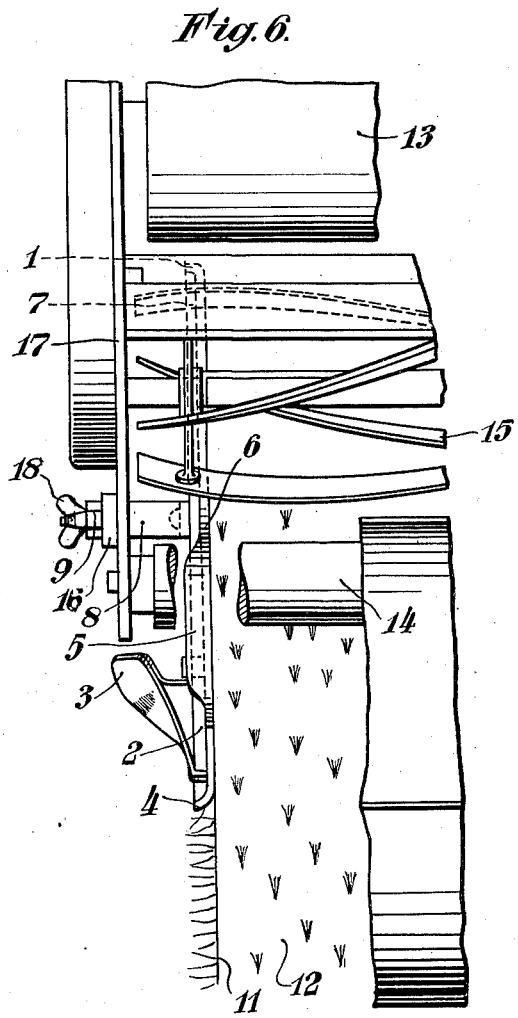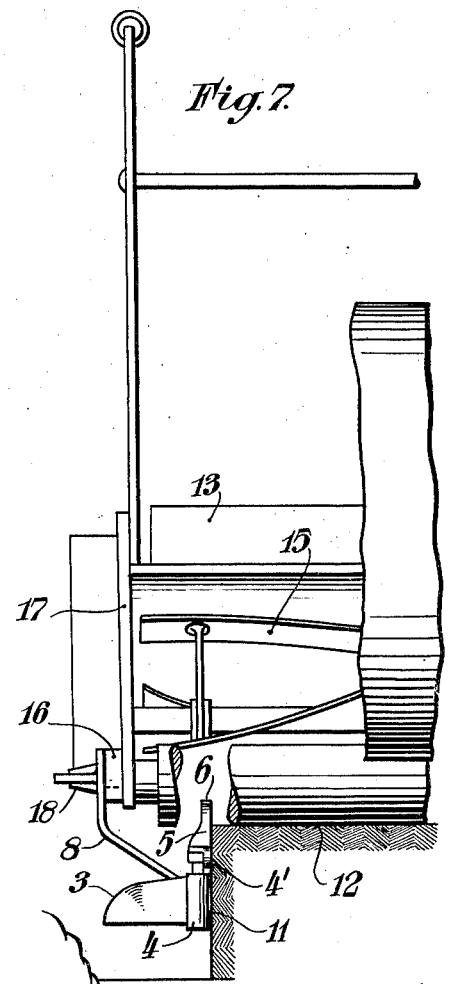

UNITED STATES PATENT OFFICE 2,126,441

GRASS MOWING APPLIANCE

Henry Richard Barnard, Heston, England

Application October 29, 1935, Serial No. 47,311
In Great Britain October 30, 1934

9 Claims. (Cl. 56—249)

This invention relates to lawn mower attachments, and it has for its object a lawn mower attachment for cutting the edges of a lawn.

According to my invention I provide an attachment for a lawn mower with rotating cutter reel, for cutting the edges of a lawn, comprising a flat piece of metal constituting the body of the attachment, shaped in the form of a substantially rectangular member with the lower edge and approximately one half of the upper edge (namely: the forward half) bent outwardly at approximately right angles to the said rectangular member, adapted to be secured vertically in position on that one side of the lawn mower, next to the edge of the lawn to be mowed, vertically underneath the said lawn mower, at about half an inch from, and inside of, the end of the revolving reel, so that, as the mower is pushed along the edge of the lawn to be mowed, the attachment travels along the said edge under the overhanging grass, picking it up and bringing it to an upright position in the path of the knives, so that it can be cut by the mower in the ordinary manner. The said rectangular member, which will be hereafter referred to as "the attachment", may be straight or curved, for use in connection with straight or curved edges or borders of the lawn to be mowed. The configuration of the top edge may vary from point to point to fit the varying disposition of the rollers and reel in different machines in connection with which the attachment is intended to be used. The attachment may be provided at the front end with a small plough-like member constituted by a flat vertical curved rectangular piece of sheet metal inclined to the flat piece forming the body of the attachment, secured at the nose end of the latter so as to form a sharp wedge, and the rear end of which is held in space relationship to the said body by a transverse distance piece. The said plough-like member is either in one piece with the body of the attachment or separate, and detachable whenever desired, being adapted to be firmly secured in position on the said attachment, for the purpose of acting as a shoulder in keeping the blade of the attachment in close contact with the turf edge; it is given the shape of a plough so that, at the same time as fulfilling the above function, it is capable of opening up the gutter and throwing up the sides of borders neatly.

The front end of the attachment is preferably bent outwardly to prevent digging under the grass edge, with the exception of a small straight piece at the top, adapted to pick up any grass that may be hanging straight down against the edge of the lawn.

The top edge of the attachment is bent outwardly, forming a horizontal flange along the foremost portion thereof, adapted to bring the grass in an upright position; this flange, however, narrows gradually towards the rear of the attachment and ends at or near the middle of the attachment, to ensure that it will function as required.

The attachment is secured to the mowing machine by suitable means, which may vary to suit different makes of machines. Preferably, the means for securing the attachment to the machine comprises a lug, strip or band of metal secured to the body of the attachment, the free end of which is adapted to fit into a correspondingly shaped holding member provided for it on the frame of the machine. The said lug, strip or band, or the end thereof, is vertical or sloping and may be slotted and is adapted to be firmly secured in position on the machine in any suitable manner, for example by tightening a single wing nut which clamps the said end of the lug, strip or band in position in the said holding member.

The attachment may be provided with an auxiliary roller adapted to rest on the surface of the lawn when the wheel on the side of the machine, to which the attachment is secured, is over the edge, thereby enabling the machine to be held at its correct level, so that it can cut the grass right up to the edge. This roller is preferably rotatably mounted on a fixed axle secured to the lug, strip or band by which the attachment is secured to the mower.

The attachment may consist of a piece of metal sufficiently thick to have the required rigidity, supporting a thinner piece of metal, secured thereto, the edge of which is turned outwardly at the bottom or lower edge to form a stiffening flange; it may also be made of a heavier gauge of metal of sufficient rigidity by itself not to require a bottom flange.

By tilting the machine by pushing the handles downwards, so as to cause it to rest on the rear roller, the front of the machine is raised so as to lift the attachment clear of the grass and soil, thereby enabling the machine to be transported from one part of a lawn to another, by rolling it on this rear roller, without damaging the surface of the lawn.

Referring to the drawings left herewith, which illustrate, as an example only, attachments to lawn mowers according to this invention—

Fig. 1 is an attachment for a lawn mower of the roller kind;

Fig. 2 is an attachment for a lawn mower with two wheels;

Fig. 3 is a curved attachment for use with curved lawn edges and borders;

Fig. 4 is a view of the attachment in position on a conventional type of mower.

Fig. 5 is a plan of the attachment, separate from a grass mower.

Fig. 6 is a part plan of a mower with the attachment in position; and

Fig. 7 is a part front elevation of a mower with the attachment in position.

The drawings represent attachments made of a thin piece 1 of metal strengthened by a thicker piece 2; 3 is the plough, shown in Fig. 1 in one piece with the attachment and held in space relationship therewith by the transverse piece 20; it is removable, and not shown, in the attachment represented in Fig. 2; 4 is the outwardly bent fore end of the attachment, and 4' is the short straight piece. In the attachment shown in Fig. 1, the top edge is bent to form a flange 5, gradually becoming upright at 6. The bottom edge is also bent to form a flange 7. In Fig. 3 these members are designated by the reference figures 1', 2', 3' . . . etc. respectively. The attachment is secured in position by lug 8 (Fig. 1) or 8' (Fig. 2), provided with a slot 9 (Fig. 1) or 9' (Fig. 2), and adapted to engage a holding member, not shown, provided on the frame of the machine in a suitable position. The attachment shown in Fig. 2 is provided with a roller 10 adapted to roll on the grass, which roller is suitably mounted on the lug 8, as shown in the figure.

In Figs. 4, 6 and 7, 11 is the edge of the lawn, 12 the lawn surface, 13 the large roller, 14 the front roller and 15 the rotating cutter reel; the attachment 1 is secured to the machine by the lug 8 clamped by the nut 18 engaging the holding member 16 on the frame 17 of the machine, and firmly held therein by the wing nut 18; 19 is the grass box. It will be readily seen from the figures that, by tilting the machine about the roller 13, so that it rests on this roller only, the attachment 1 is lifted clear of the turf, so that the mower may be rolled, on this roller 13, along the surface of the lawn, without damaging its surface.

To mow the edge of a lawn which is concave, that is, the centre of curvature of which is outside the lawn, would not be possible with an attachment according to the invention in which the metal piece 1 is straight as shown in Fig. 1 or 2, because the nose of this piece would dig into the edge of the lawn and damage it. In order to avoid this, a curved metal piece is used, as shown in Fig. 3; it is not necessary that this piece should conform to the curvature of the edge of the lawn, it is sufficient that its ends should be turned outwardly so that only the middle portion is in contact with a small arc of the lawn.

It will be understood that modifications of detail may be made to the construction described above without departing from the spirit of the invention as set forth in the statement of claim.

What I claim is:

1. An attachment for lawn mower with rotating cutter reel for cutting the edges of a lawn, comprising a flat piece of metal constituting the body of the attachment, shaped in the form of a substantially rectangular member, detachably secured to a side member of the lawn mower next to the edge of the lawn to be mowed, vertically underneath thereof, near, and inside of, the end of the revolving cutters of the lawn mower, said piece of metal having the lower edge and approximately one half of the top edge, namely, the forward half, bent outwardly to form a narrow flange approximately at right angles to the said substantially rectangular member the said member having a raised portion to fit between the periphery of the rollers and the path of the reel of the mowing machine, thereby lifting the overhanging grass and bringing it to an upright position on the path of the knives, and means for securing the said piece of metal to the said mower.

2. A lawn mower attachment as claimed in claim 1, the front end of which is bent outwardly, and provided at the top with a small straight piece.

3. A lawn mower attachment as claimed in claim 1, constituted by two juxtaposed pieces of metal, one of which is relatively thin so as to be easily shaped and bent as required, and the other is a thicker, stronger and more rigid piece, both pieces being secured together and the thicker and stronger piece being detachably secured to a side member of the frame of the lawn mower.

4. A lawn mower attachment as claimed in claim 1, in combination with a plough-like member constituted by a flat vertical curved rectangular piece of sheet metal inclined to the flat piece forming the body of the attachment, secured at the nose end of the latter so as to form a sharp wedge, and the rear end of which is held in space relationship to the said body by a transvers distance piece, in one piece with the piece of metal for keeping the blade of the attachment in close contact with the turf edge and, for opening a gutter alongside of the edge of a lawn being mowed and throwing up the sides of the border.

5. A lawn mower attachment as claimed in claim 1, in combination with a plough-like member for keeping the blade of the attachment in close contact with the turf edge and for opening a gutter alongside of the edge of a lawn being mowed and throwing up the sides of the border, said plough-like member being detachably secured to the said piece of metal.

6. A lawn mower attachment as claimed in claim 1, the means for securing the said piece of metal to the said mower comprising a slotted lug secured to the said piece of metal, adapted to fit adjustably over a pin on a side member of the frame of said mower, and a wing nut adapted to clamp the said lug to the said side member.

7. An attachment for lawn mower, with a rotating cutter reel for cutting the edges of a lawn, comprising a flat piece of metal constituting the body of the attachment, shaped in the form of a substantially rectangular member, the upper side of which has a raised portion so disposed as to fit between the periphery of the rollers and the path of the reel of the mowing machine, detachably secured to a side member of the lawn mower next to the edge of the lawn to be mowed, vertically underneath thereof, near and inside of, the end of the rotating cutter reel, thereby lifting the overhanging grass and bringing it to an upright position on the path of the knives, and means for securing the said piece of metal to the said mower.

8. A lawn mower attachment as claimed in claim 1, in which the piece of metal is curved in a horizontal direction for use when the edge of a lawn to be mowed is curved.

9. A lawn mower attachment as claimed in claim 1, combined with suitable means to secure the same onto a lawn mower with a rotating cutter reel, said means consisting in a lug of metal secured to the body of the attachment, the free end of which is adapted to fit into a correspondingly shaped holding member provided for it on the frame of the machine.

HENRY RICHARD BARNARD.